United States Patent [19]

Untz

[11] 4,208,029
[45] Jun. 17, 1980

[54] CORE APPARATUS

[75] Inventor: Robert W. Untz, Hanna City, Ill.

[73] Assignee: Caterpillar Tractor Co., Peoria, Ill.

[21] Appl. No.: 918,629

[22] Filed: Jun. 23, 1978

Related U.S. Application Data

[63] Continuation-in-part of Ser. No. 788,860, Apr. 19, 1977, abandoned.

[51] Int. Cl.² ............................ B22C 7/00; B29C 3/00
[52] U.S. Cl. .................................... 249/183; 249/184; 425/470; 425/405 R; 164/45; 164/245
[58] Field of Search ............... 425/470, DIG. 106; 249/61, 183

[56] References Cited

U.S. PATENT DOCUMENTS

| 2,985,938 | 5/1961 | Rappas | 425/DIG. 106 |
| 3,343,589 | 9/1967 | Holgl | 249/61 X |
| 3,552,480 | 1/1971 | Harris | 249/183 X |
| 3,570,585 | 3/1971 | Harris | 249/183 X |
| 3,692,551 | 9/1972 | Weaver | 249/61 X |
| 3,883,287 | 5/1975 | Grawey et al. | 425/405 R |

Primary Examiner—J. Howard Flint, Jr.
Attorney, Agent, or Firm—John W. Grant

[57] ABSTRACT

An annular member is integrally positioned within a core portion so that a side surface of the annular portion coacts with the outer surface of the core portion to form a substantially smooth and continuous outer surface of a core. A substantially inextensible portion of the annular member is joined in end-to-end relation to an elastomer portion of the annular member. An axial end portion of the elastomer portion is mechanically locked to the core portion.

2 Claims, 6 Drawing Figures

U.S. Patent
Jun. 17, 1980
4,208,029
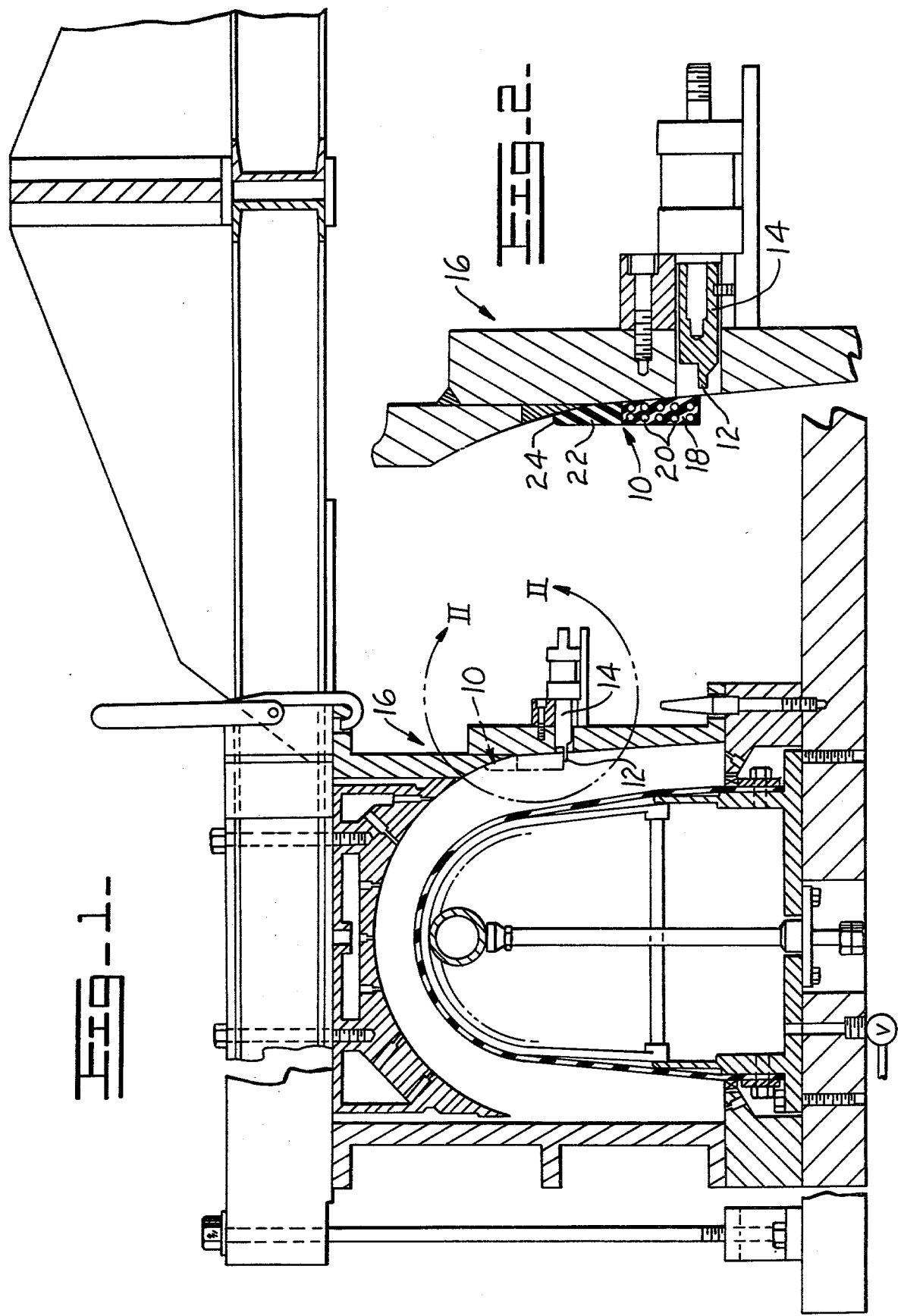

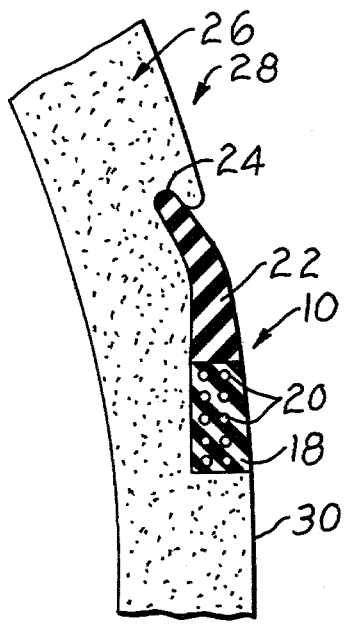
Fig-3- PRIOR ART
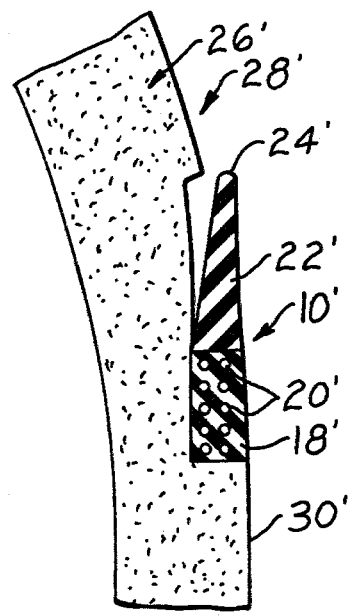
Fig-4- PRIOR ART
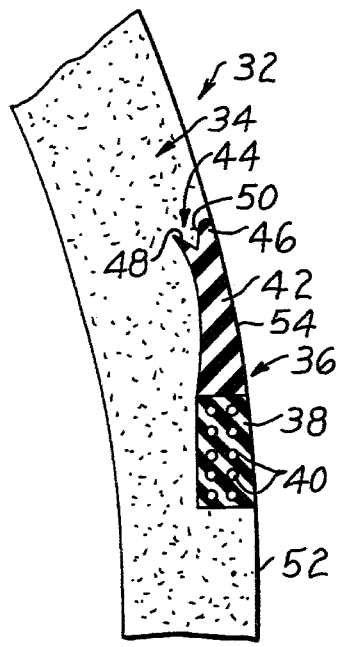
Fig-5-
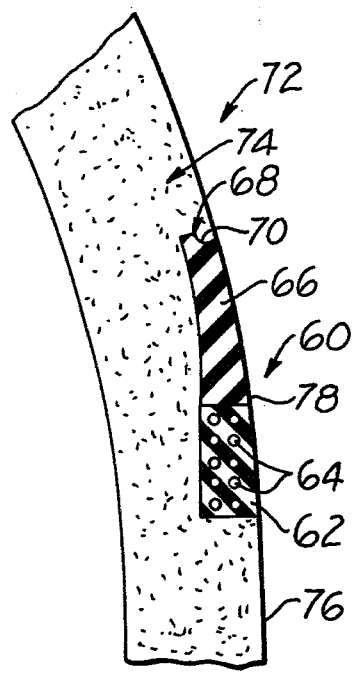
Fig-6-

CORE APPARATUS

CROSS REFERENCES TO RELATED APPLICATION

This is a Continuation-In-Part of Application Ser. No. 788,860 filed Apr. 19, 1977, by Robert W. Untz now abandoned.

BACKGROUND OF THE INVENTION

This invention relates to a core used in the formation of, for example, a tire such as disclosed in U.S. Pat. No. 3,606,921 to C. E. Grawey issued Sept. 21, 1971.

U.S. Pat. No. 3,883,287 to Grawey et al issued May 13, 1975 (assigned to the assignee of this invention), discloses apparatus including a rigid mold body and an expandable bladder associated therewith, the bladder being inflatable and expandable to form and press a core between itself and the mold body. Such core is made up of sand core material and an annular substantially inextensible roll-restraining hoop. The roll-restraining hoop as disclosed in that patent defines in cross-section a rounded upper end. In the final core as formed, a side surface of the roll-restraining hoop defines a portion of the outer surface of the core.

In general, the roll-restraining hoop of the type disclosed in that patent is made up of a first elastomeric annular part having substantially inextensible wires embedded therein, and a second annular part of elastomeric material secured to the first part. The elastomeric materials making up the separate roll-restraining hoop portions are uncured and are joined together as a unit to form the overall roll-restraining hoop. The hoop is then located within the upper portion of the mold, as described in that patent.

As is well known, all rubber materials, whether cured or uncured, tend to assume an original form when released from an applied stress. In the presently used system as disclosed in that patent, a great degree of care must be exercised in the operation joining the roll-restraining hoop sections, to provide proper relative positioning of those portions. This is extremely important since one side of the roll-restraining hoop defines a portion of the outer surface of the core, and it is of great interest that this outer surface of the core be smooth and continuous throughout. Reference will be made herein to particular problems which may result in the above system.

SUMMARY OF THE INVENTION

The present invention is directed to overcoming one or more of the problems as set forth above.

According to the present invention, an annular core has an annular member integrally positioned within a core portion. The annular member has a side surface which together with an outer surface of the core portion defines a substantially smooth and continuous outer surface of the core. The annular member includes a first substantially inextensible annular portion positioned at and connected to a first axial end of a second annular portion. The second annular portion has a second axial end portion and is constructed from a flexible elastomeric material. A means is provided for locking the second axial end portion of the second annular portion to the core portion.

BRIEF DESCRIPTION OF THE DRAWINGS

FIG. 1 is a sectional view of a portion of an overall core forming apparatus.

FIG. 2 is an enlarged view of the area II-II of FIG. 1.

FIGS. 3 and 4 are sectional views of the core formed by the apparatus of FIGS. 1 and 2, utilizing conventionally formed roll-restraining hoops.

FIGS. 5 and 6 show first and second embodiments of particular roll-restraining hoops which are the subject of this invention.

DESCRIPTION OF THE PREFERRED EMBODIMENT

Shown in FIG. 1, and in accordance with U.S. Pat. No. 3,883,287, cited above, an annular roll-restraining hoop 10 is supported by extendable and retractable fingers 12 of plungers 14 within the mold body 16 in close proximity thereto. The conventional roll-restraining hoop 10 is made up of a first annular member portion 18 of elastomeric material having wires 20 embedded therein, and a second elastomeric annular portion 22 secured thereto. It is to be seen that the roll-restraining hoop 10 defines in cross-section an end 24 of generally founded configuration. As set forth above, in the joining of the roll-restraining hoop portions 18,22, it is possible that the end 24 of the portion 22 is caused to locate more to the left with respect to a vertical line in FIG. 1 than is desired. This results in a condition wherein, subsequent to the support of the roll-restraining hoop 10 by the fingers 14, but prior to the introduction of a mixture of sand and silica binder 26, the end 24 naturally adopts the position shown in FIG. 3. Upon introduction of sand and silica binder 26 into the area described above, and upon formation of the core 28, the overall core 28 will adopt the configuration shown in FIG. 3. It will be seen that the outer surface 30 thereof is not smooth and continuous in configuration as is desired for the formation of a tube-tire on such outer surface.

Similarly, if the joining operation of the portions 18',22' causes the portion 22 to be biased to the right as shown in FIG. 4, upon removal of the core 28' from the apparatus, the portion 22' will adopt the position shown in FIG. 4, again providing a discontinuous outer surface 30' of the core 28'. In either the case of FIG. 3 or FIG. 4, it will be seen that a certain amount of reworking of the core 28,28' is necessary to indeed provide the desired outer surface of that core.

Referring to FIG. 5, it will be seen again that a core 32 includes an annular core portion 34 and an annular roll-restraining hoop member 36 integrally positioned within core portion 34. The annular member 36 has a side surface 54 which together with an outer surface 52 of core portion 34 defines a substantially smooth and continuous outer surface of core 32.

The annular member 36 is made up of a first substantially inextensible annular member portion 38 positioned at and joined to an axial end of a second annular member portion 42. The second annular member portion 42 is constructed from a flexible elastomeric material. The first annular member portion 38 is constructed from an elastomeric material and a plurality of wires 40 embedded therein and is substantially inextensible so that the overall annular member 36 is substantially inextensible. The joining operation used in the present invention is selected to intentionally bias the second annular member portion 42 to the right as viewed in FIG. 5.

A means is provided for locking an axial end portion 46 of second annular member portion 42 to core portion 34. Such means includes a V-shaped groove or depression 44 in end portion 46. A projection of the core portion 34 extends into the depression 44 and is in intimate contact with side surfaces 48,50 of the depression to provide positive and effective location of the end portion 46 relative to core portion 34.

In use, the annular roll-restraining hoop member 36 is positioned within mold body 16 in the same manner as the one previously described, and then the mixture of sand and silica binder is introduced in accordance with the above. The second annular member portion 42, being biased to the right by the joining operation, bears against the mold body which causes the second annular member portion to assume the shape of that portion of the mold body at which it contacts. A portion of the sand and silica binder introduced into the mold body enters the depression 44 so that upon subsequent curing of the mixture of sand and silica binder, a projection is formed on the core portion and provides a mechanical interlock between the end portion 46 and the core portion 34, thereby causing the second annular member portion to retain the shape of the mold body.

In FIG. 6 is shown another embodiment of a roll-restraining hoop member 60 in accordance with the present invention. As shown therein, the roll-restraining hoop member 60 is made up of an annular member portion 62 of elastomeric material having a plurality of wires 64 embedded therein and a second annular member portion 66 of flexible elastomeric material, the wires 64 rendering the overall roll-restraining hoop member 60 to be substantially inextensible. The hoop member 60 is integrally positioned within a core portion 74 and has a side surface 78 which coacts with the outer surface 76 of core portion 34 to define a substantially continuous and smooth outer surface of a core 72. The joining operation is selected to intentionally bias the second annular member portion 66 to the right as viewed in FIG. 6.

In this embodiment, the means for locking an axial end portion 68 of the second annular member portion 66 to core portion 74 includes a depression 70 formed by the end portion 68 being generally stepped in configuration. The core portion 74 intimately extends into the depression.

Again, it will be seen that the roll-restraining hoop member 60 is positioned within the mold body 16 in accordance with the FIGS. 1 and 2 disclosures. The second annular member portion 66 assumes the shape of that portion of the mold body against which it bears. A portion of the mixture of sand and silica binder introduced into the mold body enters the cavity between the end portion 68 and the mold body created by the depression 70. Curing the mixture of sand and silica binder provides a mechanical interlock between end portion 68 and core portion 74.

Other aspects, objects, and advantages of this invention can be obtained from a study of the drawings, the disclosure, and the appended claims.

What is claimed is:

1. An annular core comprising:
   a core portion formed of sand and binder and having an outer surface;
   an annular member having a side surface and being integrally positioned within said core portion, said side surface and said outer surface of said core portion being positioned relative to one another to define a smooth and continuous outer surface of said core, said annular member including an inextensible first annular portion and a second annular portion constructed from an elastomer material and having first and second axial ends, said first annular portion being positioned at and joined to the first axial end of the second annular portion in a manner causing the second axial end of said second annular portion to be biased in a direction away from said core portion;
   said second annular portion having a depression in the second axial end therof; and
   said core portion having a projection extending into the depression to position the second axial end relative to the outer surface of the core portion and to hold the second axial end relative to the core portion against the bias causing the second axial end to be biased in the direction away from said core portion.

2. The annular core of claim 1 wherein said projection of said core portion is formed in situ with the depression in the second axial end.

* * * * *